(12) United States Patent
Ema et al.

(10) Patent No.: US 7,892,343 B2
(45) Date of Patent: *Feb. 22, 2011

(54) METHOD FOR MANUFACTURING SLURRY AND MOLD FOR PRECISION CASTING

(75) Inventors: Kiyomi Ema, Toyama (JP); Yutaka Ohmori, Sodegaura (JP); Hirokazu Kato, Sodegaura (JP); Kenji Yamaguchi, Sodegaura (JP)

(73) Assignee: Nissan Chemical Industries, Ltd., Tokyo (JP)

(*) Notice: Subject to any disclaimer, the term of this patent is extended or adjusted under 35 U.S.C. 154(b) by 551 days.

This patent is subject to a terminal disclaimer.

(21) Appl. No.: 11/922,777

(22) PCT Filed: Jun. 21, 2006

(86) PCT No.: PCT/JP2006/312435

§ 371 (c)(1),
(2), (4) Date: Dec. 21, 2007

(87) PCT Pub. No.: WO2007/000927

PCT Pub. Date: Jan. 4, 2007

(65) Prior Publication Data

US 2009/0032994 A1 Feb. 5, 2009

(30) Foreign Application Priority Data

Jun. 29, 2005 (JP) ............................. 2005-190463

(51) Int. Cl.
*C23C 16/40* (2006.01)
(52) U.S. Cl. ................................. 106/287.19
(58) Field of Classification Search ........................ None
See application file for complete search history.

(56) References Cited

U.S. PATENT DOCUMENTS

| 3,819,392 | A |  | 6/1974 | Weldes et al. |
| 4,816,239 | A |  | 3/1989 | Wada et al. |
| 5,004,039 | A | * | 4/1991 | Feagin ........................ 164/361 |
| 5,234,870 | A | * | 8/1993 | Osaka et al. ................... 501/12 |
| 5,275,759 | A |  | 1/1994 | Osaka et al. |
| 7,629,389 | B2 | * | 12/2009 | Ohmori et al. ................. 516/11 |
| 7,691,910 | B2 | * | 4/2010 | Ohmori et al. ................. 516/90 |

FOREIGN PATENT DOCUMENTS

| JP | B1-50-028943 | 9/1975 |
| JP | A-05-169185 | 7/1993 |
| JP | A-08-337481 | 12/1996 |
| JP | A-2000-126845 | 5/2000 |
| JP | B2-3123074 | 10/2000 |
| JP | A-2001-018033 | 1/2001 |
| JP | B2-3138721 | 2/2001 |

* cited by examiner

*Primary Examiner*—Melvin C Mayes
*Assistant Examiner*—Stefanie Cohen
(74) *Attorney, Agent, or Firm*—Oliff & Berridge, PLC

(57) ABSTRACT

A manufacturing method for a slurry for the production of a precision casting mold that includes a zirconia sol and a refractory powder, and a manufacturing method for a precision casting mold that uses the slurry is provided. The present invention relates to a manufacturing method for a slurry for the production of a precision casting mold for a metal that includes a step in which an alkaline zirconia sol (A1) and a refractory powder (D) are mixed, the alkaline zirconia sol (A1) being obtained by a manufacturing method that includes a step (i), in which a zirconium salt (B1) is heated at 60 to 110° C. in an aqueous medium that includes a carbonate of quaternary ammonium, and a step (ii), in which a hydrothermal treatment is carried out at 100 to 250° C. In addition, the present invention relates to a manufacturing method for a slurry for the production of a precision casting mold for a metal that includes a step in which an acidic zirconia sol (C3) and a refractory powder (D) are mixed, the acidic zirconia sol (C3) being obtained by a manufacturing method that includes a step (I), in which an alkaline zirconia sol (A3) and a zirconium salt (B3) are mixed, and a step II, in which the obtained liquid mixture is caused to react at 80 to 250° C.

16 Claims, No Drawings

METHOD FOR MANUFACTURING SLURRY AND MOLD FOR PRECISION CASTING

TECHNICAL FIELD

The present invention relates to a manufacturing method for a slurry for the production of a precision casting mold that includes a zirconia sol and a refractory powder, and a manufacturing method for a precision casting mold that uses the slurry.

BACKGROUND ART

In the production of a conventional precision casting mold, solutions such as aqueous silica sol or zirconia sol, ammonium zirconium carbonate, zirconium oxyacetate, and the like are used as binders. In recent years, precision casting of active metals represented by, for example, titanium alloys, has been realized, and various methods to attain this that use, for example, a zirconia sol, a basic inorganic salt, or ammonium zirconium carbonate, as binders for the production of precision casting molds have been proposed and will be described below.

A binder for precision casting that uses an aqueous zirconia sol having a secondary particle diameter of 2 to 30 nm and having a pH of 7 to 12, has been disclosed (Patent Document 1).

A binder for precision casting that uses a zirconia sol in which calcia, magnesia, or an oxide of a rare earth element is dissolved has been disclosed (Patent Document 2).

A stucco material for precision casting has been disclosed that includes 10 mm to 3 mm particles that are obtained by drying, crushing, and calcining a slurry having a total yttria and zirconia content that is from 30 to 95% by mass, a weight ratio of Y2O3/ZrO2 from 0.5 to 40, and a pH from 4 to 13 (Patent Document 3).

A manufacturing method for a mold in which a zirconia filler and zirconium oxyacetate serving as binders are used in a slurry for precision casting has been disclosed (Patent Document 4).

A manufacturing method for a mold in which a zirconia filler and ammonium zirconium carbonate serving as binders are used in a slurry for precision casting has been disclosed (Patent Document 5).

Patent Document 1: Japanese Patent No. 3123074; specification

Patent Document 2: JP-A 5-169185; specification

Patent Document 3: Japanese Patent No. 3138721; specification

Patent Document 4: JP-A 2000-126845; specification

Patent Document 5: JP-A 2001-18033; specification

DISCLOSURE OF THE INVENTION

Problems to be Solved by the Invention

The various production methods for precision casting molds that have been described above have been proposed to present, but the slurry for the production of precision casting mold incorporates a refractory powder and various additives, and thus the colloidal zirconia particles that are included in the slurry readily become unstable. This is thought to be due to the occurrence of micro-aggregation that is caused by the colloidal zirconia particles in the slurry. Therefore, in a precision casting mold that uses such a slurry, there are cases in which the optimal mold strength cannot be attained and a suitable mold is not obtained due to the generation of microcracks.

In consideration of such conditions, it is an object of the present invention to provide precision metal castings having a high surface quality, by the use of a slurry that uses a zirconia sol, which is alkaline or acidic and sufficiently stable, as an inorganic binder for mold production, and a precision casting mold that uses the slurry.

Means to Solve the Problems

As a first aspect, the present invention is a manufacturing method for a slurry for the production of a precision casting mold for a metal, which includes a step in which an alkaline zirconia sol (A1) and a refractory powder (D) are mixed, the alkaline zirconia sol (A1) being obtained by a method that includes a step (i), in which a zirconium salt (B1) is heated at 60 to 110° C. in an aqueous medium that includes a carbonate of quaternary ammonium, and a step (ii), in which a hydrothermal treatment is carried out at 110 to 250° C.

As a second aspect, the present invention is the manufacturing method for a slurry for the production of a precision casting mold for a metal that is disclosed in the first aspect, in which the carbonate of the quaternary ammonium is $(NR_4)_2CO_3$, $NR_4HCO_3$, or a mixture thereof (where R denotes a hydrocarbon group).

As a third aspect, the present invention is the manufacturing method for a slurry for the production of a precision casting mold for a metal that is disclosed in the first aspect or the second aspect, in which quaternary ammonium ions in the carbonate of the quaternary ammonium are formed by a hydrocarbon group having 1 to 4 carbon atoms.

As a fourth aspect, the present invention is the manufacturing method for a slurry for the production of a precision casting mold for a metal that is disclosed in any one of the first aspect through third aspect, in which the zirconium salt (B1) is an oxyzirconium salt.

As a fifth aspect, the present invention is the manufacturing method for a slurry for the production of a precision casting mold for a metal that is disclosed in the fourth aspect, in which the zirconium salt (B1) is a zirconium oxycarbonate.

As a sixth aspect, the present invention is a manufacturing method for a slurry for the production of a precision casting mold for a metal that includes a step in which an alkaline zirconia sol (A2) and a refractory powder (D) are mixed, the alkaline zirconia sol (A2) being obtained by a method that includes a step in which the alkaline zirconia sol (A1) that is disclosed in the first aspect and a basic zirconium carbonate salt (B2) are mixed.

As a seventh aspect, the present invention is the manufacturing method for a slurry for the production of a precision casting mold that is disclosed in the sixth aspect, in which the alkaline zirconia sol (A2) is obtained by a method that includes a step (i'), wherein the alkaline zirconia sol (A1) and the basic zirconium carbonate salt (B2) are mixed in a proportion such that the weight ratio bs/as between the solid content (as) of the alkaline zirconia sol (A1) calculated in terms of $ZrO_2$ and the solid content (bs) of the basic zirconium carbonate salt (B2) calculated in terms of $ZrO_2$ is from 0.05 to 4.0, and a step (ii'), in which the obtained liquid mixture is aged at 20 to 100° C.

As an eighth aspect, the present invention is the manufacturing method for a slurry for the production of a precision casting mold for a metal that is disclosed in the sixth aspect or the seventh aspect, in which the basic zirconium carbonate salt (B2) is an ammonium zirconium carbonate.

As a ninth aspect, the present invention is a manufacturing method for a slurry for the production of a precision casting mold for a metal that includes a step in which an acidic zirconia sol (C3) and a refractory powder (D) are mixed, the acidic zirconia sol (C3) being obtained by a method that includes a step (I), in which an alkaline zirconia sol (A3) and a zirconium salt (B3) are mixed in a proportion such that the weight ratio Bs/As between the solid content (As) of the alkaline zirconia sol (A3) calculated in terms of $ZrO_2$ and the solid content (Bs) of the zirconium salt (B3) calculated in terms of $ZrO_2$ is from 0.2 to 5.0, and a step (II), in which the obtained liquid mixture is caused to react at 80 to 250° C.

As a tenth aspect, the present invention is the manufacturing method for a slurry for the production of a precision casting mold for a metal that is disclosed in the ninth aspect, in which the alkaline zirconia sol (A3) is the alkaline zirconia sol (A1) that is disclosed in any one of the first aspect to the fifth aspect.

As an eleventh aspect, the present invention is the manufacturing method for a slurry for the production of a precision casting mold for a metal that is disclosed in the ninth aspect or the tenth aspect, in which an aqueous solution that is selected from a group consisting of zirconium oxychloride, zirconium oxynitrate, zirconium oxysulfate, zirconium oxyacetate, and a mixture thereof is used as a zirconium salt (B3) in step (I) described above.

As a twelfth aspect, the present invention is the manufacturing method for a slurry for the production of a precision casting mold for a metal that is disclosed in the ninth aspect or the tenth aspect, in which, as the zirconium salt (B3) in step (I) described above, either an aqueous solution that includes an aqueous solution of ammonium zirconium carbonate and an acid is used, or an aqueous solution of ammonium zirconium carbonate is used, and then an acid is added to the mixed system and used.

As a thirteenth aspect, the present invention is the manufacturing method for a slurry for the production of a precision casting mold for a metal that is disclosed in the ninth aspect or the tenth aspect, in which an aqueous solution that is obtained by adding an alkali to an aqueous solution of an oxyzirconium salt is used as the zirconium salt (B3) in step (I) described above.

As a fourteenth aspect, the present invention is the manufacturing method for a slurry for the production of a precision casting mold for a metal that is disclosed in the ninth aspect or the tenth aspect, in which an aqueous solution that is obtained by subjecting an aqueous solution of an oxyzirconium salt to anion exchange is used as the zirconium salt (B3) in step (I) described above.

As a fifteenth aspect, the present invention is the manufacturing method for a slurry for the production of a precision casting mold for a metal that is disclosed in the ninth aspect or the tenth aspect, in which an aqueous solution that is obtained by adding zirconium hydroxide or zirconium oxycarbonate to an aqueous solution of oxyzirconium salt is used as the zirconium salt (B3) in step (I) described above.

As a sixteenth aspect, the present invention is a manufacturing method for a precision casting mold for a metal that includes immersing a wax pattern into the slurry for the production of a precision casting mold that is disclosed in any one of the first aspect to the fifteenth aspect, adhering a stucco material to the wax pattern, dewaxing by heating the wax pattern to which the stucco material is adhered, and subsequently calcining the obtained mold.

Effects of the Invention

Stable alkaline zirconia sol and acidic zirconia sol that are obtained by the characteristic manufacturing method are used as an inorganic binder that is used in a slurry for the production of a precision casting mold for a metal.

Specifically, in an alkaline zirconia sol, hydrolysis progresses accompanied by the generation of a gas such as an amine or carbon dioxide due to heating a zirconium salt, such as a zirconium oxycarbonate, in an alkaline aqueous medium that includes a carbonate of quaternary ammonium, and the oxyzirconium ions and the like are stabilized by the interaction with the quaternary ammonium ions that are derived from a carbonate of the quaternary ammonium. A stable alkaline zirconia sol (A1) is obtained by subjecting the hydrolytic liquid in this state to a hydrothermal treatment at a temperature that is equal to or higher than 110° C. This alkaline zirconia sol is one in which the distribution of the particle diameters is uniform, and it is used in the slurry for the production of precision casting molds for metals of the present invention.

In addition, the alkaline zirconia sol (A2) is obtained by mixing the alkaline zirconia sol (A1) and a basic zirconium carbonate salt (B2), and aging the liquid medium thereof. The alkaline zirconia sol (A2) is obtained by a manufacturing method that includes a step (i'), in which the alkaline zirconium (A1) and the basic zirconium carbonate salt (B2) are mixed in a proportion such that the weight ratio bs/as between the solid content (as) of the alkaline zirconia sol (A1) calculated in terms of $ZrO_2$ and the solid content (bs) of the zirconium salt (B2) calculated in terms of $ZrO_2$ is from 0.05 to 4.0, and a step (ii'), in which the obtained liquid mixture is caused to react at 20 to 100° C.

In addition, the acidic zirconia sol is an acidic zirconia sol (C3) that is obtained by a method in which an alkaline zirconia sol (A3) and a zirconium salt (B3) are mixed, and the liquid medium thereof is subjected to a hydrothermal treatment.

Specifically, the acidic zirconia sol (C3) is obtained by a manufacturing method that includes a step (I) in which the alkaline zirconia sol (A3) and the zirconium salt (B3) are mixed in a proportion such that the weight ratio Bs/As between the solid content (As) of the alkaline zirconia sol (A3) calculated in terms of $ZrO_2$ and the solid content (Bs) of the zirconium salt (B3) calculated in terms of $ZrO_2$ is from 0.2 to 5.0, and a step (II) in which the obtained liquid mixture is caused to react at 80 to 250° C., and zirconia particles having a particle diameter of less than 20 nm are incorporated at a proportion of 10 to 50% by mass with respect to the total zirconia particles. That is, zirconia particles (b) having a particle diameter of less than 20 nm are incorporated at a proportion of 10 to 50% by mass relative to the total zirconia particles, and the remainder (90 to 50% by mass) is zirconia particles (a) having a particle diameter range from 20 to 300 nm.

In the acidic zirconia sol, the zirconia particles of the alkaline zirconia sol (A3), which is used for the raw material in step (I), are changed to zirconia particles (a) having a particle diameter range from 20 to 300 nm. In the acidic zirconia sol, a portion of the zirconium salt (B3) becomes zirconia particles (b) that have a particle diameter of less than 20 nm, and the remainder thereof covers the periphery of the particles of the alkaline zirconia sol (A3), which is the raw material, to change to zirconia particles (a). Therefore, among the zirconia particles in the obtained acidic zirconia sol (C3), zirconia particles (b) having a particle diameter of less than 20 nm are incorporated at a proportion of 10 to 50% by mass with respect to the total zirconia particles, and the remainder thereof (from 90 to 50% by mass) is zirconia particles (a) that have a particle diameter range from 20 to 300 nm.

The acidic zirconia sol (C3) possesses particulate characteristics and binding characteristics, and the large particles and the small particles of the hardened material of this acidic zirconia sol are densely packed. Thus, the adhesion to the adherend and the surface hardness are both high. In the method in which a zirconium salt is hydrolyzed in the presence of alkaline zirconia sol, the zirconia particles that are present from the beginning play the role of a stabilizer, and a portion of the fine particles that are generated by the hydrolysis of the zirconium salt adheres to the surface of the zirconia particles. Thus, in comparison to the case in which fine particles are present together, there is no flocculation, and a stable alkaline zirconia sol having high storage stability can be obtained. In addition, the obtained alkaline zirconia sol possesses the binding characteristics that mainly derive from the zirconia particles (b) having a particle diameter of less than 20 nm and particulate characteristics that mainly derive from the zirconia particles (a) that have a particle diameter range from 20 to 300 nm, because the zirconia particles (b) having a particle diameter that is less than 20 nm and the zirconia particles (a) having a particle diameter range from 20 to 300 nm coexist in a good balance. Accordingly, when this alkaline zirconia sol is used as a binder, a highly hardened material can be obtained. This acidic zirconia sol (C3) can be used in a slurry for the production of a precision casting mold for a metal of the present invention.

Because the stability of the slurry is high, a mold that is obtained by the slurry for the production of a precision casting mold for a metal that uses the alkaline zirconia sol (A1), the alkaline zirconia sol (A2), or the acidic zirconia sol (C3) is one in which flocculation of the slurry due to aging-dependent changes does not occur, changes in the slurry properties do not occur, and the smoothness of the surface of the metal that has been cast by using this mold is high.

BEST MODES FOR CARRYING OUT THE INVENTION

A first method of the present invention is a manufacturing method for a slurry for the production of a precision casting mold for a metal, which includes a step in which an alkaline zirconia sol (A1) and a refractory powder (D) are mixed, the alkaline zirconia sol (A1) being obtained by a method that includes a step (i) in which a zirconium salt (B1) is heated at 60 to 110° C. in an aqueous medium that includes a carbonate of quaternary ammonium, and a step (ii), in which a hydrothermal treatment is carried out at 110 to 250° C.

The inorganic binder of the slurry for the production of a precision casting mold that is used in the present invention uses the alkaline zirconia sol (A1) that is obtained by a manufacturing method that includes a step (i) in which a zirconium salt (B1) is heated at 60 to 110° C. in an aqueous medium that includes a carbonate salt of quaternary ammonium, and a step (ii) in which a hydrothermal treatment is carried out at 110 to 250° C.

This alkaline zirconia sol (A1) is obtained by a method that includes a step in which a zirconia salt is heated at 60 to 110° C. in an aqueous medium that includes, for example, a carbonate salt of quaternary ammonium, and a step in which a hydrothermal treatment is carried out at 110 to 250° C.

Examples of a carbonate salt of quaternary ammonium are $(NR_4)_2(CO_3)$ and $NR_4HCO_3$, and these may be used singly or may be used as a mixture. The quaternary ammonium ions in the quaternary ammonium carbonate salt have a hydrocarbon group having 1 to 18 carbon atoms, and examples of these hydrocarbon groups are saturated or unsaturated chain hydrocarbon groups, and alicyclic or aromatic cyclic hydrocarbon groups. Examples of unsaturated and saturated chain hydrocarbon groups include methyl group, ethyl group, propyl group, isopropyl group, octyl group, decyl group, octadecyl group, ethynyl group, and propenyl group. In addition, examples of cyclic hydrocarbon groups include phenyl group, tolyl group, styryl group, benzyl group, naphthyl group, and anthryl group. Among these, for these quaternary ammonium ions, a hydrocarbon group having 1 to 4 carbon atoms is preferable, and examples include methyl group, ethyl group, propyl group, and isopropyl group, and tetramethylammonium hydrocarbon formed by four methyl groups can be suitably used.

In the case in which the carbonate that is used is one that incorporates an ammonium ion other than quaternary ammonium ions, a stable zirconia sol (A1) cannot be obtained. In the case in which, for example, tertiary ammonium ions such as $(CH_3)_3HN$, secondary ammonium ions such as $(CH_3)_2H_2N$, primary ammonium ions such as $(CH_3)H_3N$, or ammonium ions $NH_4$ is used, a sufficiently stable zirconia sol (A1) cannot be obtained.

In manufacturing the alkaline zirconia sol (A1), a carbonate of quaternary ammonium can be obtained in the form of an aqueous solution in which the carbonate of quaternary ammonium is incorporated at a proportion of 30 to 60% by mass, and in particular, an aqueous solution in which the carbonate of quaternary ammonium is incorporated at 44.5% by mass in a proportion calculated in terms of a quaternary ammonium hydroxide can be readily obtained as a commercially available product. The concentration of the carbonate of the quaternary ammonium is obtained by a method in which the measurement thereof is calculated in terms of the quaternary ammonium hydroxide.

An oxyzirconium salt such as zirconium oxychloride, or zirconium oxycarbonate can be used as the zirconium salt (B1) that is used in the manufacture of the alkaline zirconia sol (A1). In particular, zirconium oxycarbonate can be preferably used as the zirconium salt (B1).

The carbonate of quaternary ammonium is added to an aqueous medium to make an alkaline hydrous medium. Here, in the case in which a quaternary ammonium hydride is used instead of a carbonate of quaternary ammonium, a sufficiently stable zirconia sol cannot be obtained, and the zirconia sol separates into two layers in the slurry state. In addition, in the case in which other alkali sources, such as sodium hydroxide, are used in order to make an alkaline hydrous medium, stable hydrolysates of the zirconium salt cannot be obtained, and a stable zirconia sol (A1) cannot be obtained even if these hydrolysates are subjected to a hydrothermal treatment. However, it is possible to use together a carbonate of quaternary ammonium and other alkali sources, examples being water soluble inorganic salts such as sodium hydroxide, potassium hydroxide, lithium hydroxide, and ammonia; amines such as n-propyl amine, monoethanol amine, and triethanol amine; water soluble organic bases such as monomethyltriethanol ammonium hydroxide, and tetramethyl ammonium hydroxide; and carbonates other than a carbonate of quaternary ammonium, such as ammonium carbonate. In the case in which an alkaline material is used in a mixture, preferably the weight ratio of the carbonate of quaternary ammonium and other alkaline materials is:

(carbonate of quaternary ammonium):(other alkaline material)=1:0.01 to 1.

Step (i), in which the alkaline zirconia sol (A1) is manufactured, is a step in which a zirconium salt is heated at 60 to 110° C. in an aqueous medium that includes a carbonate of quaternary ammonium.

The pH of the aqueous medium that is used in step (i), in which the alkaline zirconia sol (A1) is manufactured, is from 9 to 12, and in the aqueous medium, the amount of the carbonate of quaternary ammonium is from 10 to 35% by mass. In addition, the zirconium salt is present in the form of $ZrO_2$ at 5 to 20% by mass in this aqueous medium. In step (i), the hydrolysis does not progress sufficiently on the condition that the heating temperature is equal to or less than 60° C., and a stable zirconia sol (A1) cannot be obtained even when these are subjected to a hydrothermal treatment. In addition, when the temperature in step (i) is equal to or greater than 110° C., there is no aging time for the hydrolysis, and hydrothermal treatment is directly carried out, which is not preferable. Step (i) is normally carried out for 1 to 20 hours.

Step (ii), in which the alkaline zirconia sol (A1) is manufactured, is a step in which a hydrothermal treatment is carried out at 100 to 250° C. after step (i). When the temperature is equal to or less than 110° C., a hydrothermal treatment cannot be obtained, and in addition, when the temperature is equal to or greater than 250° C., a large-scale apparatus becomes necessary. The hydrothermal treatment is carried out by using an autoclave. Step (ii) is normally carried out for 1 to 20 hours. After passing through this hydrothermal treatment, the hydrolysate of the zirconium salt becomes zirconia particles. The zirconia particles that are obtained after passing through this step have a range of 20 to 300 nm when observed using a transmission electron microscope.

The liquid that has passed through step (ii) described above is alkaline, having a pH from 8 to 12. While the liquid in this condition can be satisfactorily used as the zirconia sol (A1), it is possible to eliminate unnecessary salts by applying a step (iii), in which washing with purified water is carried out by using an ultrafiltration apparatus, and it is possible to obtain a high purity alkaline zirconia sol (A1).

The alkaline zirconia sol (A1) that has passed through step (iii) has the following physical properties: a pH from 8 to 12, a specific surface area from 50 m$^2$/g to 300 m$^2$/g, a concentration from 30 to 60% by mass, a conductivity of 2000 to 10000 µS/cm, and a viscosity of 1 to 30 mPa·s. In addition, the particle diameter distribution is in a range from 20 to 300 nm.

This alkaline zirconia sol (A1) remains stable for one month or more on the condition that the temperature is 50° C.

The alkaline zirconia sol (A1) can incorporate as desired additives, for example, water soluble inorganic salts such as sodium hydroxide, potassium hydroxide, lithium hydroxide, and ammonia; amines such as n-propyl amine, monoethanol amine, and triethanol amine; and water soluble organic salts such as monomethyltriethyl ammonium hydroxide and tetramethyl ammonium hydroxide.

A second method of the present invention is a manufacturing method for a slurry for the production of a precision casting mold for a metal that includes a step in which an alkaline zirconia sol (A2) and a refractory powder (D) are mixed, the alkaline zirconia sol (A2) being obtained by a method that includes a step in which the alkaline zirconia sol (A1) and a basic zirconium carbonate salt (B2) are mixed. This alkaline zirconia sol (A2) is obtained by a manufacturing method that includes a step (i') in which an alkaline zirconia sol (A1) and a basic zirconium carbonate salt (B2) are mixed in a proportion such that the weight ratio bs/as between the solid content (as) of the alkaline zirconia sol (A1) calculated in terms of $ZrO_2$ and the solid content (bs) of the basic zirconium carbonate salt (B2) calculated in terms of $ZrO_2$ is from 0.05 to 4.0, and a step (ii') in which the obtained liquid mixture is aged at 20 to 100° C.

It is possible to use a well-known alkaline zirconia sol for the alkaline zirconia sol (A1), but preferably the alkaline zirconia sol (A1) that is obtained in the first method is used.

The alkaline zirconia sol (A2) that is used in the present invention includes a step (i') in which alkaline zirconium (A1), which serves as the raw material, and basic zirconium carbonate salt (B2) are mixed in a proportion such that the weight ratio bs/as between the solid content (as) of the alkaline zirconia sol (A1) calculated in terms of $ZrO_2$ and the solid content (bs) of the basic zirconium salt carbonate (B2) calculated in terms of $ZrO_2$ is from 0.05 to 4.0, and a step (ii') in which the obtained liquid mixture is aged at 20 to 100° C.

Preferably, in step (i'), the mixture has a proportion in which the weight ratio bs/as between the solid content (as) of the alkaline zirconia sol (A1) calculated in terms of $ZrO_2$ and the solid content (bs) of the zirconium salt (B2) calculated in terms of $ZrO_2$ is from 0.05 to 4.0, and preferably from 0.2 to 2.0.

Because the value of bs/as is set in a range from 0.2 to 2.0, it is possible to obtain an alkaline zirconia sol (A2) having an improved storage stability.

The basic zirconium carbonate salt (B2) of step (i') is used in a mixture of ammonium zirconium carbonate $(NH_4)_2[Zr(CO_3)_2(OH)_2]$, potassium zirconium carbonate $K_2[Zr(CO)_3)_2(OH)_2]$, and the alkaline zirconia sol (A1), which serves as the aqueous solution for the mixture thereof. Among these, the ammonium zirconium carbonate is preferable. The ammonium zirconium carbonate may also have the form of $(NH_4)_2[ZrO(CO_3)_2]$.

The aqueous solution of the basic zirconium carbonate salt is used that has a pH from 8 to 12 and a concentration of 1 to 20% by mass.

Preferably, a method is used in which the basic zirconium carbonate salt (B2) is mixed with the alkaline zirconia sol (A1) in an aqueous solution state. Preferably, a concentration of the zirconium salt (B2) in the aqueous solution is used that is in a range of 1 to 20% by mass.

In step (i') of the present invention, an alkaline zirconia sol (A1) and a basic zirconium carbonate salt (B2) are mixed in a proportion such that the weight ratio bs/as between the solid content (as) of the alkaline zirconia sol (A1) calculated in terms of $ZrO_2$ and the solid content (bs) of the basic zirconium carbonate salt (B2) calculated in terms of $ZrO_2$ is from 0.05 to 4.0.

The mixture of the aqueous solution of the alkaline zirconia sol (A1) and the basic zirconium carbonate salt (B2) is attained by using a method in which the alkaline zirconia sol (A1) is added to an aqueous solution of the basic zirconium carbonate salt (B2), a method in which the aqueous solution of the basic zirconium carbonate salt (B2) is added to the alkaline zirconia sol (A1), or a method in which both are mixed simultaneously.

When the weight ratio bs/as is les than 0.05, the amount of the alkaline zirconia sol (A1) that is used becomes large, and there is a concern that the manufacturing cost will become high. In addition, when the weight ratio bs/as exceeds 4.0, the proportion of particles (b) that has a particle diameter range of less than 20 nm becomes large, and the stability of the sol is reduced.

Step (ii') of the present invention is a method in which the liquid mixture that has been obtained in step (i') described above is aged at 20 to 100° C. A method in which this aging heats the liquid solution to a temperature of 60 to 100° C. is more preferable. Preferably, this aging is carried out for 0.5 hours to 12 hours.

The aging adjusts the size of the colloidal particles that are generated by leaving them to stand.

The pH of the alkaline zirconia sol that is obtained by passing through step (ii') is from 8 to 12.

Although there is a small amount of particle growth in the alkaline zirconia sol (A2) that is generated by passing through step (ii'), the zirconia particles of the alkaline zirconia sol (A1), which is the raw material, are zirconia particles (a) that are generally within a particle diameter range of 20 to 300 nm, and in the alkaline zirconia sol (A2), which is generated after the basic zirconium carbonate salt (B2) has passed through step (ii'), zirconia particles (b) having a particle diameter range of less than 20 nm, and zirconia particles (a), a portion of which bind with and cover the particles of the alkaline zirconia sol (A1), which is the raw material, are included. The particle diameter can be identified by using a transmission electron microscope. The proportion of the zirconia particles (a) and the zirconia particles (b) can be quantified. More specifically, the generated alkaline zirconia sol is processed in a centrifugal separation apparatus, the supernatant becomes a liquid that includes the zirconia particles (b), and the solid content thereof is measured. The zirconia particles (a) can be quantified by measuring the solid content of the precipitate.

The zirconia particles (b) in the alkaline zirconia sol (A2) are zirconia particles having a small particle diameter that can be identified by an electron microscope, but the component that cannot be identified by the electron microscope can be considered to be a superfine colloid of the zirconium oxide.

The liquid that includes the zirconia particles (b) having a particle diameter of less than 20 nm, are small diameter zirconia particles or a superfine colloid of zirconium oxide that is difficult to distinguish even by using an electron microscope. However, even if the material is difficult to distinguish by an electron microscope, the product of drying this liquid by evaporation can be considered to be a superfine colloid of zirconium oxide because it can be identified to be zirconium oxide by X-ray diffraction.

A zirconia sol that includes zirconia particles (a) having a particle diameter range of 20 to 300 nm may also be stable singly, but a zirconia sol that includes zirconia particles (b) having a particle diameter range of less than 20 nm or a superfine colloid of zirconium oxide does not readily stably exist singly, and in this manufacturing process, gelling does occurs easily.

The surface of the zirconia particles in the alkaline zirconia sol (A1) that is used in the present invention is negatively charged on the alkaline side. In contrast, in the basic zirconium carbonate salt (B2), for example, an ammonium zirconium carbonate, the zirconium carbonate ions are negatively charged. For example, in step (i'), in which alkaline zirconia sol (A1) and the basic ammonium zirconium carbonate (B2) are mixed, by mixing the alkaline zirconia sol into an aqueous solution of ammonium zirconium carbonate, the zirconia particles in the alkaline zirconia sol (A1) and the zirconium carbonate ions of the ammonium zirconium carbonate (B2) both stably exist carrying a negative charge, and by aging this liquid mixture in step (ii'), the zirconia particles that derive from the alkaline zirconia sol (A1) and the fine zirconia particles that derive from the basic ammonium zirconium carbonate (B2) are generated. A portion of these fine zirconia particles are generally caused to chemically bind with the zirconia particles that derive from the alkaline zirconia sol (A1) by aging or heating, and zirconia particles in an amount equivalent to those bound and covered by these fine zirconia particles cause particle growth. The other fine zirconia particles separate from the zirconia particles that derive from alkaline zirconia sol (A1), and are either present singly in the liquid, or the fine zirconia particles bind together due to aging or heating to bring about particle growth.

According to the present invention, the obtained alkaline zirconia sol (A2) has a particle diameter distribution wider than that of alkaline zirconia sol (A1) used as a raw material, and becomes an alkaline zirconia sol in which large particles to small particles of zirconia, and a superfine colloidal zirconia are present. Although the stability is low in the case of an alkaline zirconia sol that consists of only small zirconia or superfine colloidal zirconia, the stability of the alkaline zirconia sol according to the present invention, which includes the small zirconia and the superfine colloidal zirconia that form in the presence of large zirconia, is high.

In the presence of the alkaline zirconia sol (A1), which serves as a raw material, due to aging and thermal hydrolysis of the basic zirconium carbonate salt (B2), the alkaline zirconia sol of the present invention that includes large zirconia particles (a) and small zirconia particles (b), which include superfine colloidal zirconia oxide, is obtained.

Even if step (ii') of the present invention is carried out only with an aqueous solution of the basic zirconium carbonate salt (B2), without using the alkaline zirconia sol (A1), which serves as a raw material, a gelled substance is readily generated, and a stable zirconia sol cannot be manufactured.

In addition, a third method of the present invention is a manufacturing method for a slurry for the production of a precision casting mold for a metal that includes a step in which an acidic zirconia sol (C3) and a refractory powder (D) are mixed, the acidic zirconia sol (C3) being obtained by a manufacturing method that includes a step (I), in which the alkaline zirconia sol (A3) and the zirconium salt (B3) are mixed in a proportion such that the weight ratio Bs/As between solid content (As) of the alkaline zirconia sol (A3) calculated in terms of $ZrO_2$ and the solid content (Bs) of the zirconium salt (B3) calculated in terms of $ZrO_2$ is from 0.2 to 5.0, and a step (II), in which the obtained liquid mixture is caused to react at 80 to 250° C.

The inorganic binder of the slurry for the production of a precision casting mold of the present invention is an acidic zirconia sol (C3) that is obtained by a manufacturing method that includes the step (I) described above, in which the alkaline zirconia sol (A3) and the zirconium salt (B3) are mixed in a proportion such that the weight ratio Bs/As between the solid content (As) of the alkaline zirconia sol (A3) calculated in terms of $ZrO_2$ and the solid content (Bs) of the zirconium salt (B3) calculated in terms of $ZrO_2$ is from 0.2 to 5.0, and the step (II) described above, in which the obtained liquid mixture is caused to react at 80 to 250° C.

The acidic zirconia sol (C3) described above is a zirconium oxide sol (C3) in which zirconia particles that have a particle diameter of less than 20 nm are incorporated at a proportion of 10 to 50% by mass relative to the total zirconia particles. Specifically, the zirconia particles (b) having a particle diameter of less than 20 nm are incorporated at a proportion of 10 to 50% by mass with respect to the total zirconia particles, and the remainder (90 to 50% by mass) are zirconia particles (a) that have a particle diameter range from 20 to 300 nm.

In step (I) described above, the alkaline zirconia sol (A3) and the zirconium salt (B3) are mixed in a proportion such that the weight ratio Bs/As between the solid content (As) of the alkaline zirconia sol (A3) calculated in terms of $ZrO_2$ and the solid content (Bs) of the zirconium salt (B3) calculated in terms of $ZrO_2$ is from 0.2 to 5.0, and preferably 0.5 to 3.0, and more preferably, 0.5 to 2.5.

By setting the value of Bs/As in a range from 0.5 to 3.0, and more preferably from 0.5 to 2.5, it is possible to obtain an acidic zirconium sol having a more improved storage stability.

An alkaline zirconia sol having a pH from 8 to 12 can be preferably used for the alkaline zirconia sol (A3). A well-known zirconia sol can be used for this alkaline zirconia sol (A3), but the alkaline zirconia sol (A1) that has been described above may be preferably used. The alkaline zirconia sol (A1) described above with a pH in a range of 8 to 12 and a concentration in a range of 1 to 20% by mass can be used in step (I) of the present invention.

In step (I), in which the acidic zirconia sol (C3) is manufactured, the zirconium salt (B3) is used as an aqueous solution of a zirconium salt or an aqueous solution of a zirconium salt that has the pH is adjusted.

In the case (B3-1) in which the zirconium salt (B3) in step (I) is used in a mixture with the alkaline zirconia sol (A1) as an aqueous solution selected from a group consisting of a zirconium oxychloride, a zirconium oxynitrate, a zirconium oxysulfate, a zirconium oxyacetate, or a mixture thereof, an acidic aqueous solution of an oxyzirconium salt such as zirconium oxychloride $[ZrOCl_2]$, zirconium oxide dinitrate $[ZrO(NO_3)_2]$, zirconium oxide sulfate $[ZrOSO_4]$, and zirconium oxyacetate $[ZrO(CH_3COO)_2]$ can be used. In the case of (B3-1), an aqueous solution of an oxyzirconium salt that has a pH from 0.1 to 3.0 and a concentration of 1 to 20% by mass can be used.

In (B3-2), the zirconium salt (B3) in step (I) described above is used in a mixture with the alkaline zirconia sol (A1) as an aqueous solution that incorporates an aqueous solution of ammonium zirconium carbonate and an acid, or an acid is added to the mixed system after being used in a mixture with the alkaline zirconia sol (A1) as an aqueous solution of ammonium zirconium carbonate. In the case of (B3-2), examples of the method are the case in which the zirconium salt (B3) is used in a mixture with alkaline zirconia sol (A1) as an acidic aqueous solution of oxyzirconium salt that has been obtained by adding an acid to ammonium zirconium carbonate $[(NH_4)_2ZrO(CO_3)_2]$, and the case in which the ammonium zirconium carbonate $[(NH_4)_2ZrO(CO_3)_2]$ is used in a mixture with the alkaline zirconia sol (A1), and subsequently an acid is added to this mixture system. The acids that can be used here include inorganic acids such as hydrochloric acid, nitric acid, and sulfuric acid, and organic acids such as formic acid and acetate. However, in particular, preferably inorganic acids such as hydrochloric acid, nitric acid, and sulfuric acid are used. In the case of (B3-2), an aqueous solution of ammonium zirconium carbonate is used that has a concentration from 1 to 15% by mass. The acidic aqueous solution of the oxyzirconium salt that is obtained by adding an acid to ammonium zirconium carbonate has a pH from 0.1 to 4.0. In addition, in the case in which an acid is further added to the mixture system after using the ammonium zirconium carbonate $[(NH_4)_2ZrO(CO_3)_2]$ in a mixture, the addition of the acid is carried out until the pH of this mixture system is within a range of 0.1 to 4.0.

In the case (B3-3), in which the zirconium salt (B3) of step (I) described above is used in a mixture with the alkaline zirconia sol (A1) as an aqueous solution that is obtained by adding an alkali to an aqueous solution of an oxyzirconium salt, an acid aqueous solution of an oxyzirconium salt that has been obtained by adding an alkali component to an aqueous solution of an oxyzirconium salt is used. The oxyzirconium salt that is used here can be selected from one among the species that are disclosed in (B3-1), or used by mixing two or more species. In addition, examples of the alkali component include water soluble inorganic salts such as sodium hydroxide, potassium hydroxide, lithium hydroxide, and ammonium, and water soluble organic bases such as carbonates, for example, sodium carbonate and potassium carbonate, and monomethyltriethyl ammonium hydroxide and tetramethyl ammonium hydroxide. An aqueous solution in the case of (B3-3) that has a pH from 0.1 to 4.0 and a concentration from 1 to 15% by mass is used.

In the case (B3-4), in which the zirconium salt (B3) in step (I) described above is used in a mixture with the alkaline zirconia sol (A1) as an aqueous solution that is obtained by subjecting an aqueous solution of an oxyzirconium salt to anion exchange, an acidic colloidal solution of superfine zirconium oxide is used that has been obtained by subjecting an aqueous solution of oxyzirconium salt to anion exchange and has a particle diameter of less than 20. The oxyzirconium salt that is used here can be selected from the one among the species that is disclosed in (B3-1), or can be used by mixing two or more species. In addition, the anion exchange can be attained by being brought into contact with an anion exchange resin. A method can be carried out in which an aqueous solution of oxyzirconium salt is fed into a column that is charged, for example, with a hydroxyl group form anion exchange resin. The fine colloid solution in the case of (B3-4) has a pH from 0.1 to 4.0 and a concentration from 1 to 20% by mass.

In the case of (B3-5), in which the zirconium salt (B3) in step (I) is used in a mixture with the alkaline zirconia sol (A1) as an aqueous solution that is obtained by adding zirconium hydroxide or zirconium oxycarbonate to an aqueous solution of an oxyzirconium salt, an acidic aqueous solution obtained by adding zirconium hydrate $[ZrO(OH)_2]$ or zirconium oxycarbonate $[ZrOCO_3]$ to an aqueous solution of the oxyzirconium salt that has been disclosed in (B3-1) is used. The aqueous solution in the case of (B3-5) that has a pH from 0.1 to 4.0 and a concentration from 1 to 20% by mass can be used.

In a method in which the alkaline zirconia sol (A1) and the zirconium salt (B3) are mixed, with respect to the usage of the zirconium salt (B3), one method among (B3-1) to (B3-5) can be selected, or several methods from among (B3-1) to (B3-5) can be selected, and a combination thereof can be used.

In the method of using zirconium salt (B3), the method (B3-2), in which an acid such as nitric acid or hydrochloric acid is added to the basic ammonium zirconium carbonate $[(NH_4)_2ZrO(CO_3)_2]$ to make it acidic, can be used. In addition, a method from (B3-3) to (B3-5), in which an alkali such as ammonia is added to the zirconium salt (B3), or a treatment is carried out using an ion exchange resin, or a zirconium hydrate or zirconium oxycarbonate is added, can be used. By carrying out treatments (B3-2 to B3-5) on the zirconium salt (B3), the balance of the oxizirconium ions of the zirconium salt (B3) and the acid ions changes, and thereby a hydrolytic reaction is promoted. In addition, in the case in which an alkali such as ammonia or the like is added to the zirconium salt (B3), or in the case in which a treatment that employs an ion exchange resin is carried out, in the zirconium salt that is obtained after this treatment has been carried out, the charge of the oxyzirconium ions must remain positive charge, and thus it is desirable that the pH after the treatment be a pH that is equal to or less than 5, and preferably a pH that is equal to or less than 4, and more preferably, a pH that is equal to or less than 3. In addition, in the case in which zirconium hydrate or zirconium oxycarbonate is added to the zirconium salt (B3), preferably they are mixed in a proportion such that the weight ratio Bs/Bs' of the solid content (Bs') of the zirconium hydroxide or the zirconium oxycarbonate calculated in terms of $ZrO_2$ and the solid content (Bs) of the zirconium salt (B3) calculated in terms of $ZrO_2$ is 1.0 to 10.0, and preferably 2.0 to 10.0. Furthermore, the hydrolytic reaction is further promoted when a thermal treatment is carried out after adding the zirconium hydroxide or the zirconium oxycarbonate to the zirconium salt (B3), and thus this is more preferable.

A method in which these zirconium salts (B3) are mixed with an alkaline zirconia sol (A1) in an aqueous solution state is preferable. Preferably, a zirconium salt (B3) in the aqueous solution that has a concentration in a range 1 to 20% by mass is used.

In step (I), the alkaline zirconia sol (A1) and the zirconium salt (B3) are mixed in a proportion such that the weight ratio Bs/As between the solid content (As) of the alkaline zirconia sol (A1) calculated in terms of $ZrO_2$ and the solid content (Bs) of the zirconium salt (B3) calculated in terms of $ZrO_2$ is from 0.2 to 5.0.

The mixture of the alkaline zirconia sol (A1) and the aqueous solution of the zirconium salt (B3) is attained by using a method in which the alkaline zirconia sol (A1) is added to the aqueous solution of the zirconium salt (B3).

When the weight ratio Bs/As is less than 0.2, the amount of alkaline zirconia sol (A1) that is used becomes large, and there is a concern that the manufacturing cost will become high. In addition, when the weight ratio Bs/As exceeds 5.0, the proportion of particles (b) that have a particle diameter range of less than 20 nm becomes large, and the stability of the sol is reduced.

In step (II), the liquid mixture that has been obtained in step (I) is caused to react at 80 to 250° C. At less than 80° C., a sufficient hydrothermal treatment cannot be obtained, and at a temperature that exceeds 250° C., the apparatus becomes large scale. This hydrothermal treatment is carried out by using an autoclave apparatus. Step (II) is normally carried out for 1 to 20 hours. After passing through this hydrothermal treatment, the acidic zirconia sol (C3) that is used in the present invention is obtained.

The pH of the acidic zirconium sol that is obtained after passing through step (II) is from 0.1 to 5.0, and preferably from 0.1 to 2.0.

Although there is a small amount of particle growth in the acidic zirconia sol (C3) that has been generated after passing through step (II), the zirconia particles of the alkaline zirconia sol (A1) are zirconia particles (a) mainly in a particle diameter range of 20 to 300 nm, and the acidic zirconia sol (C3) that is generated after the zirconium salt (B3) has passed through step (II) includes zirconia particles (b) that have a particle diameter range of less than 20 nm and zirconia particles (a), a portion of which cover the particles of the alkaline zirconia sol (A1), which serves as the raw material. The particle diameters can be identified by using a transmission electron microscope. The proportion of the zirconia particles (a) and the zirconia particles (b) can be quantified by processing the generated acidic zirconia sol in a centrifugal separation apparatus. The supernatant is a liquid that includes the zirconia particles (b), and the solid content thereof is measured. The zirconia particles (a) can be quantified by measuring the solid content of the precipitate.

For example, the following method can be provided as a method for measuring the content of the zirconia particles in the acidic zirconia sol that have a particle diameter of less than 20 nm. The acidic zirconia sol is diluted with purified water, and 30 g of the diluted liquid that incorporates 0.5% by mass as $ZrO_2$ is prepared. 15 g of this diluted liquid measured and distributed into each of two specified vessels. The vessels that contain this diluted liquid are placed into a centrifugal separation apparatus (manufactured by Tomy Seiko, trade name SRX-201, for example), and a centrifugal separation process is carried out at 20000 rpm for 1 hour. After the centrifugal separation process, the samples in the vessels are separated into two portions, that is, a portion consisting of an almost colorless and clear supernatant and a portion consisting of a white precipitate. When a portion of this supernatant is observed by using a transmission electron microscope, only zirconia particles that were smaller than 20 nm were observed, and zirconia particles that were larger than or equal to 20 nm were not observed. Subsequently, the entire amount of the supernatant portion is recovered and the weight of the recovered liquid is measured. The entire amount of the recovered supernatant portion is transferred to a magnetic crucible, and after the water content is evaporated at 100° C., the result is calcined in a furnace for 10 minutes at 800° C. After cooling, the weight of the residua that remained in the crucible is measured. Zirconia particles having a particle diameter range of less than 20 nm are all defined as being present in this supernatant portion, and the content of the zirconia particles having a particle diameter range of less than 20 nm was calculated by the formula shown below:

Content (%) of zirconia particles having a particle diameter range of less than 20 nm=[(calcined residua of supernatant portion)/(solid content calculated in terms of $ZrO_2$ in the diluted liquid collected in the vessel)]×100

The zirconia particles (b) in the acid zirconia sol (C3) include zirconia particles having a small particle diameter that can be identified by an electron microscope, but the component that cannot be identified by an electron microscope is considered to be a superfine colloid of zirconium oxide.

In the acidic zirconia sol (C3), the zirconia particles (b) that have a particle diameter of less than 20 nm are incorporated at 10 to 50% by mass relative to the total zirconia particles, and the remainder (90 to 50% by mass) is zirconia particles (a) that have a particle diameter range of 20 to 300 nm.

The liquid that includes the zirconia particles (b) that have a particle diameter of less than 20 nm are zirconia particles having a small particle diameter or are a superfine colloid of zirconium oxide that are difficult to distinguish even using an electron microscope. However, even if the material is difficult to distinguish by an electron microscope, the product of drying this liquid by evaporation can be considered to be a superfine colloid of zirconium oxide because it can be identified by X-ray diffraction to be zirconium oxide.

A zirconia sol having the zirconia particles (a) that have a particle diameter range of 20 to 300 nm stably exists singly, but a zirconia sol having zirconia particles (b) that have a particle diameter range of less than 20 nm and a superfine colloid of zirconium oxide do not readily stably exist singly, and gelling occurs easily in the manufacturing process thereof. Therefore, in a method in which a zirconia sol having zirconia particles (a) that have a particle diameter range from 20 to 300 nm, a zirconia sol having zirconia particles (b) that have a particle diameter range of less than 20 nm, and a superfine colloid of zirconium oxide are simply mixed, the acidic zirconia sol that is used in the present invention cannot be obtained.

In the alkaline zirconia sol (A1) that is used in the present invention, the surface of the zirconia particles thereof carries a negative charge on the alkaline side. In contrast, in the zirconium salt (B3), for example, zirconium oxynitrate, the oxyzirconium ions $ZrO^{2+}$ carry a positive charge. For example, in step (I), in which the alkaline zirconia sol (A1)

and the zirconium oxynitrate (B3) are mixed, by adding alkaline zirconia sol to the aqueous solution of zirconium oxynitrate, the oxyzirconium ions $ZrO^{2+}$ of the zirconium oxynitrate (B3) adhere to the zirconia particle surfaces in the alkaline zirconia sol (A1), and in step (II), by subjecting this liquid mixture to a hydrothermal treatment, fine zirconia particles are generated on the zirconia particle surfaces that derive from the alkaline zirconia sol (A1). A portion of these fine zirconia particles are caused to chemically bind with the zirconia particles that derive from the alkaline zirconia sol (A1) during the hydrothermal reaction, and zirconia particles in an amount equivalent to the fine particles that are covered cause particle growth. However, the other fine zirconia particles separate from the zirconia particles that derive from the alkaline zirconia sol (A1), and either exist singly in the liquid, or the fine zirconia particles bind together due to the hydrothermal reaction, and particle growth occurs.

However, in the case in which an aqueous solution of the zirconium oxynitrate (B3) is added to the alkaline zirconia sol (A1) in step (I), because the aqueous solution of the zirconium oxynitrate (B3) is an acidic solution, the pH of the alkaline zirconia sol (A1) is reduced, and depending on the case, becomes acidic, the negative charge of the surfaces of the zirconia particles is reduced, or depending on the case, because a positive charge is carried, the capacity to absorb the oxyzirconium ions $ZrO^{2+}$ that derive from the zirconium salt (B3) on the particle surfaces thereof decreases. Thus, on the zirconia particle surfaces, a change from the oxyzirconium ion $ZrO^{2+}$ to a fine zirconia particle occurs with difficulty, and rather, in a free state in the liquid, without fastening to the zirconia particles, the $ZrO^{2+}$ causes hydrolysis during the hydrothermal reaction. Thus, the fine zirconia particles and the superfine colloid readily gel together.

However, if such gelling can be overcome, a method in which an aqueous solution of zirconium salt (B3) is added to the alkaline zirconia sol (A1) can be carried out by the present invention. Specifically, a blade such as a dispersion blade that exhibits a sheer force is used in order to control such gelling, and under the condition of high-speed mixing, and thus it is possible to manufacture an acidic zirconia sol by a method in which an aqueous solution of, for example, zirconium oxynitrate (B3) is added to the alkaline zirconia sol (A1). By carrying out the addition under such conditions, the oxyzirconium ions $ZrO^{2+}$ readily adhere uniformly to the zirconia particle surfaces, and thereby the gelling between the fine zirconia particles and the superfine colloid occurs with difficulty.

According to the present invention, the obtained acidic zirconia sol is one in which the particle diameter distribution is wider than the alkaline zirconia sol that is used as the raw material, and large particle zirconia to small particle zirconia and zirconia superfine colloid are present. The stability of the acidic zirconia sol consisting of small particle zirconia and the zirconia superfine colloid is low, but the stability of the acidic zirconia sol that includes small particle zirconia formed in the presence of large particle zirconia according to the present invention and zirconia superfine colloid is high.

By subjecting a zirconium salt (B3) to thermal hydrolysis in the presence of the alkaline zirconia sol (A1), the acidic zirconia sol (C3) that is used in the present invention can be obtained, this acidic zirconia sol (C3) incorporating large zirconia particles (a) and small zirconia particles (b), which include zirconium oxide superfine colloid.

If step (II) is carried out with only an aqueous solution of zirconium salt (B3) without using alkaline zirconia sol (A1), only a gelled substance is produced, and a stable zirconia sol cannot be manufactured.

After step (II), it is possible to carry out a step (III), in which desalting and concentrating are carried out. A method in which desalting is carried out by using an ultrafiltration membrane can be provided as an example, and the concentrating can be carried out while carrying out aqueous cleaning until the concentration is 10 to 40% by mass.

The obtained zirconia sol is the acidic zirconia sol (C3) that has a pH of 0.1 to 5.0, and preferably, of 1.5 to 4.5.

The pH of the acidic zirconia sol (C3) can be made into an alkaline zirconia sol by lowering the pH by adding, as a pH adjustor, an acidic substance such as hydrochloric acid, nitric acid, or acetic acid, or increasing the pH by adding an alkali substance such as sodium hydroxide, ammonia, or quaternary ammonium or the like, as a pH adjustor.

The present invention is a manufacturing method for a slurry for the production of a precision casting mold for a metal that includes a step in which the alkaline zirconia sol (A1), alkaline zirconia sol (A2), or the acidic zirconia sol (C3) is mixed with a refractory powder (D).

The slurry for the production of a precision casting mold for a metal can freely incorporate organic binders, surfactants, and defoaming agents, in addition to the zirconia sol (A1, A2, or C3) and the refractory powder (D).

The refractory powder (D) may use one species or a combination of two or more species of the refractory powder among alumina, zirconia, electrofused calcia, sintered calcia, electrofused calcia stabilized zirconia, electrofused magnesia stabilized zirconia, zircon, yttria, titania, calcium zirconate, yttria stabilized zirconia, mullite, ceria, lithium aluminate, lithium titanate, calcium aluminate, beryllia, calcium titanate, magnesium titanate, and calcium aluminate, and the like. These refractory powders (D) have a particle diameter from 40 μm to 150 μm.

The weight ratio of the solid content of the zirconia sol (A1, A2, or C3) calculated in terms of $ZrO_2$ and the refractory powder (D) is from 1:5 to 1:15.

Examples of an organic binder include: vinyl acetate resin emulsions such as a polyvinyl acetate emulsion, ethylene-vinyl acetate copolymer emulsion, polyvinyl acetate-maleate ester copolymer emulsion, polyvinyl acetate copolymer acrylate ester emulsion, and polyvinyl acetate VeoVa copolymer emulsion and the like; acrylic acid emulsions such as ethylene polyacrylate emulsion or styrene-polyacrylate ester copolymer emulsion; styrene emulsions such as styrene-butadiene copolymer resin emulsion; celluloses such as methyl cellulose, ethyl cellulose, and carboxymethyl cellulose; and water soluble high molecular compounds such as polyvinyl alcohol or polyvinyl pyrolidone.

The weight ratio of the solid content of the zirconia sol (A1, A2, or C3) calculated in terms of $ZrO_2$ and the solid content of the organic binder is 1:0.05 to 1:2.

Surfactants include nonionic surfactants and anionic surfactants. The nonionic surfactants include, for example, polyoxyethylenes, polyethyleneimines, and sorbitan alkyl ester, and anionic surfactants include, for example, carboxylate, higher alcohol sulfuric acid ester salts, polyethylene glycol ether sulfuric acid ester salts, sulfuric acid ester salts of olefin, amide-bound sulfuric acid ester salt, ester-bound sulfuric acid ester salt, ester-bound sulfonate, amide-bound sulfonate, ether-bound sulfonate, and alkylallyl sulfonate.

The weight ratio of the solid content of the zirconia sol (A1, A2, or C3) calculated in terms of $ZrO_2$ and the solid content of the surfactant is from 1:0.005 to 1:0.05.

Alcohol defoaming agents such as octanol and diethylene glycol, or nonionic surfactants can be used as defoaming agents.

The weight ratio of the solid content of the zirconia sol (A1, A2, or C3) calculated in terms of $ZrO_2$ is from 1:0.005 to 1:0.05.

Normally, this slurry has a solid content of 75 to 90% by mass, a pH from 3 to 11, and a viscosity of 10 to 45 seconds (measured by using a No. 4 cup by using the Zhan cup method).

This manufacturing method for a precision casting mold for a metal is one in which step (1), in which a wax pattern that has been produced in advance is immersed in the slurry for the production of precision casting molds, step (2), in which a stucco material is adhered to the wax pattern to which the slurry has been adhered in step (1), and step (3), in which drying is carried out after step (2), are repeated in sequence 5 to 15 times, and subsequently the wax pattern to which the stucco material has been adhered is dewaxed by heating, and the obtained mold is calcined.

The stucco material may use one species or a combination of two or more species among, for example, alumina, zirconia, electrofused calcia stabilized zirconia, beryllia, electrofused calcia, sintered calcia, electrofused magnesia stabilized zirconia, zircon, yttria, titania, calcium zirconate, yttria stabilized zirconia, mullite, ceria, lithium aluminate, lithium titanate, calcium aluminate, calcium titanate, magnesium tinanate, and calcium aluminate. It is possible to use a stucco material having a particle diameter in a range of 10 to 200 mesh.

It is possible to obtain the green mold by carrying out dewaxing by burning off the wax by heating of the wax pattern to which the stucco has been adhered in an autoclave for 15 minutes to 1 hour at 100 to 150° C. In addition, it is possible to carry out dewaxing by calcining the mold in a calcining furnace and simultaneously burning off the wax. The casting mold for a metal is obtained by calcining this green mold in a range from 700 to 1500° C. for 30 minutes to 12 hours.

A metal that is preferably used in the casting method that uses the mold that has been obtained by the slurry for the production of a mold of the present invention is an active metal, and examples of such a metal include titanium metal, an alloy that mixes aluminum and vanadium with titanium, magnesium metal, and an alloy that mixes aluminum and cobalt with magnesium. These metals have a high metal activity, and an oxide layer on the metal surface is readily formed. The oxide layer on the metal surface, which is referred to an α case, is readily produced in open-air casting, and the strength of the metal after casting is reduced. Thus, a finishing, in which the oxide layer is removed, is carried out by using methods such as cutting, polishing, and chemical polishing. However, the oxide layer of these metals is hard, and thus cutting and polishing are difficult and time consuming, and in addition, the finishing is time consuming if the oxide layer is very thick. Therefore, when these metals are cast, even in casting methods that use a mold that has been obtained by the slurry for the production of a mold of the present invention, a method can be selected in which casting is carried out on the condition that a vacuum molding method that can block oxygen is also used, and thus the oxide layer referred to as the a case is not generated.

In connection with this, in conventionally available casting methods in which a mold that is obtained from a slurry in which a silica sol is used as a binder, in the case in which we assume an active metal is cast by using a vacuum casting method, the oxide layer that is referred to as the α case is generated due to the oxygen in the $SiO_2$ particles in the silica gel, and the strength of the metal is reduced.

In addition, in the casting method of the present invention, if the mold is for a metal for which a decrease in the strength of the metal is not a problem, for example, a metal such as iron or aluminum, it is possible to use an open-air casting method even if an oxide layer is produced on the metal surface.

EXAMPLES

Example 1

950 g of an aqueous solution of tetramethyl ammonium hydrogen carbonate (made by Tama Chemicals Co. Ltd., incorporated at 44.5% by mass calculated in terms of tetramethyl ammonium hydroxide) and 950 g of purified water were charged into a 3-liter glass vessel to form a diluted aqueous solution. After heating this aqueous solution up to 95° C. with stirring, zirconium carbonate powder ($ZrOCO_3$), made by Daiichi Kigenso Kagaku Kogyo Co., Ltd., incorporated at 42.1% by mass as $ZrO_2$) was gradually added to the aqueous solution, to charge a total of 585.2 g. After the addition was completed, heating and aging were further continued, and aging was carried out at 95° C. for 3 hours. At the point in time that this aging was completed, the mixed liquid was in a slurry state, incorporated at 9.9% by mass as $ZrO_2$, and had a pH of 9.5. This slurry was moved to a stainless steel autoclave vessel, and a hydrothermal synthesis reaction was carried out at 140° C. for 3 hours with stirring. The product that was obtained after this reaction was a complete sol with no undissolved material, incorporated at 9.9% by mass as $ZrO_2$, and had a pH of 8.8. Next, this sol was washed and concentrated by using an ultrafiltration apparatus while gradually adding purified water, a high-concentration zirconia sol was obtained that had a $ZrO_2$ concentration of 48.9% by mass. This obtained sol had a specific gravity of 1.722, a pH of 8.8, and a viscosity of 5.5 mPa·s, a tetramethyl ammonium hydroxide concentration (by the titration method) of 1.2% by mass, and a particle diameter of 82 nm as measured by a dynamic light scattering method.

The diameter of the particles in the sol was measured by the dynamic light scattering method, and when the particles had flocculated, the mean particle diameter of these flocculated particles was measured.

When the particles were identified by a transmission electron microscope, most of the flocculated particles were primary particles of about 10 nm that had become flocculated and bound together, and the size of single flocculated particles was from 30 to 200 nm. In addition, this zirconia sol had no precipitate and remained stable for one month or more on the condition that the temperature was 50° C.

150 g of this alkaline zirconia sol, 615 g of commercially available calcium stabilized zirconium oxide powder (made by Fukushima Steel Works Co., Ltd.; trade name Zirbon GA #325 mesh or under), 1.05 g of commercially available surfactant (made by Freeman (Japan) Co., Ltd.; trade name Victorwet 12), and 0.45 g of commercially available defoaming agent (made by Kanto Chemical Co., Inc.; constituent, 2-octanol) were mixed to prepare a slurry (S11) for the first layer and the second layer. The viscosity of this slurry was 34.9 seconds by the Zhan cup method (measured by a No. 4 cup). This slurry exhibited no increase in viscosity even after being left to stand for one month in a sealed vessel, and the slurry remained stable.

In addition, 200 g of commercially available alkaline zirconia sol (made by Nissan Chemical Industries Ltd.; trade name Snowtex 30, incorporated at 30% by mass as $SiO_2$), 615 g of commercially available zirconium silicate powder (made by Kinsei Matec Co., Ltd.; trade name Zircon flour #200), 1.4 g of commercially available nonionic surfactant (made by Freeman (Japan) Co., Ltd.; trade name Victorwet 12), and 0.6 g of commercially available defoaming agent (Kanto Chemical Co., Inc.; constituent, 2-octanol) were mixed to prepare a back-up slurry (S21). The viscosity of this slurrly was 20.3 seconds by the Zhan cup method (measured by a No. 4 cup). This slurry exhibited no increase in viscosity even after being left to stand for one month in a sealed vessel, and the slurry remained stable.

A commercially available wax for precision molds (made by Shinwa Resin Co., Ltd.; trade name Shinwa resin 338) was melted and adhered to a brass plate (3 mm×20 mm×150 mm), and subsequently the surface was washed with acetone to produce a test wax pattern.

This wax pattern was immersed in the S11 slurry and then dusted with a calcium stabilized zirconium oxide powder (made by Fukushima Steel Works Co., Ltd; trade name Zirbon GA, 16 to 100 mesh) that had been prepared as a stucco for the first layer. Subsequently, this was left to stand in a chamber having a temperature of 23° C. and relative humidity from 50 to 60% for 3 hours and dried (preparation of the first layer).

Next, the test mold that has been coated with the first layer was immersed in the S11 slurry, and then dusted with an electrofused alumina powder (made by Pacific Rundum Co. Ltd.; trade name electrofused alumina 50R, grain size, 1.0 mm) that had been prepared as the stucco for the second layer. Subsequently, this was left to stand in a chamber having a temperature of 21 to 23° C. and a relative humidity of 50 to 60% for 3 hours and dried (preparation of the second layer).

Next, the test mold that has been coated with the second layer was immersed in the S21 slurry, and then dusted with mullite sand (made by Kinsei Matec Co., Ltd.; trade name Mullite Sand; grain size, 0.7 to 1.0 mm) that had been prepared as the stucco for the back-up. Subsequently, this was left to stand in a chamber having a temperature of 23° C. and a relative humidity of 50 to 60% for 3 hours and dried (preparation of the back-up layer).

The production step for this back-up layer was further repeated three times, four back-up layers were coated thereon, and after drying, finally the product was immersed in the back-up slurry (S21) to produce a 7 layer mold, and this mold was left to stand in a chamber having a temperature of 23° C. and a relative humidity of 50 to 60% for 24 hours, and dried to produce the test mold.

A brass portion of the produced mold was heated to melt the wax, which was separated from the brass to produce a green mold.

The green mold was calcined 30 minutes in an electric furnace at 1000° C. to produce a calcined mold.

In addition, a green mold is immersed for 10 minutes in a boiling hot water bath and subsequently removed, thereby forming the mold test piece (boiled mold), which is the mold that is equivalent to the pattern being removed by vapor pressure furnace.

The strength of the green mold (green mold test piece), the calcined mold (the calcined mold test piece), and the mold equivalent to an autoclaved mold (boiled mold test piece) was measured by using a transverse strength test machine (made by Orientec Co., Ltd.; trade name Tenshiron, model UCT-10T).

The breaking load was found by using the obtained strengths as stipulated in the calculating methods that are described in JIS R1601.

Example 2

614 g of purified water was added to 2,915 g of the alkaline zirconia sol that was produced identically to that in Example 1, 1,532 g of ammonium zirconium carbonate (made by Daiichi Kigenso Kagaku Kogyo Co., Ltd.; trade name Zircosol AC-20, incorporated at 20.0% by mass as $ZrO_2$) is added thereto with stirring, and stirred for 30 minutes. The stirred sol is fed to a hydrothermal reactor having an attached 5 L stainless steel mixer, the temperature was raised to 80° C., and maintained for 30 minutes. Subsequently, the cooled and removed sol had a pH of 9.52, an electrical conductivity of 33.3 mS/cm, a specific gravity of 1.404, 30.5% by mass as $ZrO_2$, a viscosity of 5.3 mPa·s, and particle diameter of 103 nm as determined by the dynamic light scattering method. In the dynamic light scattering method, the particle diameter of the particles in the sol was measured, and when particles had flocculated, the mean particle diameter of these flocculated particles was measured.

When the particles were identified by using a transmission electron microscope, fine primary particles of less than 20 nm that were present in an almost completely monodispersed state and flocculated particles of about 10 nm, which were primary particles that had flocculated and were bound together, coexisted, and the size of single flocculated particles was from 30 to 200 nm. In addition, this zirconia sol had no precipitate and remained stable for one month or more on the condition that the temperature was 50° C.

185 g of this alkaline zirconia sol, 615 g of commercially available calcium stabilized zirconium oxide powder (made by Fukushima Steel Works Co., Ltd.; trade name Zirbon GA, #325 mesh or under), 1.3 g of commercially available surfactant (made by Freeman (Japan) Col, Ltd.; trade name Victorwet 12), and 0.56 g of commercially available defoaming agent (made by Kanto Chemical Co., Inc.; constituent, 2-octanol) were mixed to prepare a slurry (S12) for the first layer and the second layer. The viscosity of this slurry was 34.2 seconds (measured by a No. 4 cup) using the Zhan cup method. The slurry exhibited no increase in viscosity even after being left to stand for one month at room temperature in a sealed vessel, and the slurry remained stable.

Other than using S12 for the slurry for the first layer and the second layer, operations identical to those of Example 1 were carried out to produce a mold test piece, and the mold transverse strength was measured.

Example 3

383.5 g of purified water was added to 1230 g of alkaline zirconia sol that was produced identically to that in Example 1, and 165 g of 10 wt % nitric acid aqueous solution was added thereto with stirring, and stirred for 3 hours. After stirring, the sol had a pH of 3.28 and an electrical conductivity of 2.81 mS/cm. While gradually adding purified water by using an ultrafiltration apparatus, the stirred sol was cleaned and then concentrated, and a highly concentrated zirconia sol that had a $ZrO_2$ concentration of 30.9% by mass was obtained. This obtained sol had a specific gravity of 1.360, a pH of 3.86, a viscosity of 2.6 mPa·s, a nitric acid concentration (by the titration method) of 0.73% by mass, and a particle diameter of 93 nm according to the dynamic light scattering method. In the dynamic light scattering method, the particle diameter of the particles in the sol was measured, and when the particles had flocculated, the mean particle diameter of these flocculated particles was measured. When the particles were identified by a transmission electron microscope, almost all of the particles were flocculated particles in which primary particles of about 10 nm had flocculated and were bound together, and the size of single flocculated particles was from 30 to 200 nm. In addition, this zirconia sol had no precipitate, and remained stable for a month or more on the condition that the temperature was 50° C.

150 g of this acidic zirconia sol, 660 g of commercially available calcium stabilized zirconium oxide powder (made by Fukushima Steel Works Co., Ltd.; trade name Zirbon GA, #325 mesh or under), 1.05 g of commercially available surfactant (made by Freeman (Japan) Co., Ltd.; trade name Victorwet 12), and 0.45 g of commercially available defoaming agent (made by Kanto Chemical Co., Inc.; constituent, 2-octanol) were mixed to prepare a slurry (S13) for the first layer and the second layer. The viscosity of this slurry was 35.3 seconds (measured by a No. 4 cup) using the Zhan cup method. The slurry exhibited no increase in viscosity even after being left to stand for one month at room temperature in a sealed vessel, and the slurry remained stable.

Other than using S13 for the slurry for the first layer and the second layer, operations identical to those of Example 1 were carried out to produce a mold test piece, and the mold transverse strength was measured.

Example 4

42,895 g of purified water was added to 4,131 g of the alkaline zirconia sol that was produced identically to that in Example 1, 2,977 g of zirconium oxynitrate (made by Daiichi Kigenso Kagaku Kogyo Co., Ltd.; trade name Zircosol Zn, incorporated at 25.2% by mass as $ZrO_2$) is added thereto with stirring, and stirred for one hour. The stirred sol had a pH of 1.71 and an electrical conductivity of 16.22 mS/cm. The stirred sol was charged into a hydrothermal reactor having an attached 50 L mixer made of glass lining, the temperature was raised to 145° C., and maintained for 5 hours. Subsequently, the cooled and removed sol had a pH of 1.18 and an electrical conductivity of 41.7 mS/cm. When the cooled sol was washed by using an ultrafiltration apparatus while gradually adding purified water, and concentrated, a high concentration zirconia sol that had a $ZrO_2$ concentration of 30.6% by mass was obtained. This obtained sol had a specific gravity of 1.368, a pH of 3.74, a viscosity of 5.4 mPa·s, a nitric acid concentration (by the titration method) of 1.67% by mass, and a particle size of 92 nm according to the dynamic light scattering method. In the dynamic light scattering method, the particle diameter of the particles in the sol was measured, and when particles had flocculated, the mean particle diameter of these flocculated particles was measured. When the particles were identified by using a transmission electron microscope, fine primary particles of less than 20 nm that were present in an almost completely monodispersed state and flocculated particles of about 10 nm, which were primary particles that had flocculated and were bound, coexisted, and the size of single flocculated particles was from 30 to 200 nm. In addition, this zirconia sol had no precipitate and remained stable for one month or more on the condition that the temperature was 50° C.

150 g of this acidic zirconia sol, 645 g of commercially available calcium stabilized zirconium oxide powder (made by Fukushima Steel Works Co., Ltd.; trade name Zirbon GA, #325 mesh or under), 1.05 g of commercially available surfactant (made by Freeman (Japan) Co., Ltd.; trade name Victorwet 12), and 0.45 g of commercially available defoaming agent (made by Kanto Chemical Co., Inc.; constituent, 2-octanol) were mixed to prepare a slurry (S14) for the first layer and the second layer. The viscosity of this slurry was 35.4 seconds according to the Zhan cup method (measured by a No. 4 cup). The slurry exhibited no increase in viscosity even after this slurry was left to stand for one month at room temperature in a sealed vessel, and the slurry remained stable.

Other than using S14 for the slurry for the first layer and the second layer, operations identical to those of Example 1 were carried out to produce a mold test piece, and the mold transverse strength was measured.

Comparative Example 1

150 g of commercially available ammonium zirconium carbonate (made by Daiichi Kigenso Kagaku Kogyo Co., Ltd.; trade name Zircosol AC-20, incorporated at 20.0% by mass as $ZrO_2$), 645 g of commercially available calcium stabilized zirconium oxide powder (made by Fukushima Steel Works Co., Ltd.; trade name Zirbon GA, #325 mesh or under), 1.05 g of commercially available surfactant (made by Freeman (Japan) Co., Ltd.; trade name Victorwet 12), and 0.45 g of commercially available defoaming agent (made by Kanto Chemical Co., Inc.; constituent, 2-octanol) were mixed to prepare a slurry (S15) for the first layer and the second layer. The viscosity of this slurry was 35.1 seconds according to the Zhan cup method (measured by a No. 4 cup). The slurry exhibited no increase in viscosity even after being left to stand for one month at room temperature in a sealed vessel, and the slurry remained stable.

Other than using S15 for the slurry for the first layer and the second layer, operations identical to those of Example 1 were carried out to produce a mold test piece, and the mold transverse strength was measured.

Comparative Example 2

150 g of commercially available zirconium acetate (made by Daiichi Kigenso Kagaku Kogyo Co., Ltd.; trade name Zircosol ZA-20, incorporated at 20.0% by mass as $ZrO_2$), 650 g of commercially available calcium stabilized zirconium oxide powder (made by Fukushima Steel Works Co., Ltd.; trade name Zirbon GA, #325 mesh or under), 1.05 g of commercially available surfactant (made by Freeman (Japan) Co., Ltd.; trade name Victorwet 12), and 0.45 g of commercially available defoaming agent (made by Kanto Chemical Co., Inc.; constituent, 2-octanol) were mixed to prepare a slurry (S16) for the first layer and the second layer. Using a No. 4 Zhan cup, the viscosity of this slurry was found to be 34.9 seconds. The slurry exhibited no increase in viscosity even after this slurry was left to stand for one month at room temperature in a sealed vessel, and the slurry remained stable.

Other than using S16 for the slurry for the first layer and the second layer, operations identical to those of Example 1 were carried out to produce a mold test piece, and the mold transverse strength was measured.

The results of the transverse strength test by using the mold test pieces produced in the Examples 1 to 4 and the Comparative Examples 1 and 2 are shown in TABLE 1.

TABLE 1

Transverse strength (kg/cm²) of molds

| | Green mold test piece | Boiled mold test piece | Calcined mold test piece |
|---|---|---|---|
| Example 1 | 47 | 42 | 106 |
| Example 2 | 55 | 36 | 108 |
| Example 3 | 36 | 31 | 78 |
| Example 4 | 53 | 50 | 113 |
| Comparative Example 1 | 54 | 39 | 76 |
| Comparative Example 2 | 45 | 20 | 73 |

When Comparative Example 1 and Examples 1 and 2 were compared, the values of the strength of the green mold and the boiled mold were substantially identical, but the strength of the calcined mold of examples 1 and 2 according to the present invention was higher than that of the comparative example 1.

When Comparative Example 2 and Examples 3 and 4 were compared, results were obtained in which the strength of the boiled mold of Examples 1 and 2 according to the present invention was higher than that of Comparative Example 2, and the strength of the calcined mold of Examples 1 and 2 was equivalent to or greater than that of Comparative Example 2.

In addition, when Examples 1 to 4 were compared to Comparative Examples 1 and 2, the values of the hardness of the calcined mold surface were substantially equivalent, and there were no drawbacks such as powder scattering.

In the case in which a slurry was used in which zirconium salt and a refractory powder were mixed, as was done conventionally, a sufficient mold transverse strength could not be obtained, but in the method that used the zirconia sol that was manufactured from a zirconium salt under the specified conditions, as in the present invention, a high mold transverse strength was obtained.

INDUSTRIAL APPLICABILITY

The precision casting mold obtained by the present invention can be used to obtain a mold for casting active metals such as titanium alloys, in which an oxide layer defect referred to as an alpha case becomes a problem, because an inactive zirconia is used in the surface that comes into contact with the casting metal.

The invention claimed is:

1. A manufacturing method for a slurry for the production of a precision casting mold for a metal, which includes a step in which an alkaline zirconia sol (A1) and a refractory powder (D) are mixed, the alkaline zirconia sol (A1) being obtained by a method that includes a step (i), in which a zirconium salt (B1) is heated at 60 to 110° C. in an aqueous medium that includes a carbonate of quaternary ammonium, and a step (ii), in which a hydrothermal treatment is carried out at 110 to 250° C.

2. The manufacturing method for a slurry for the production of a precision casting mold for a metal according to claim 1, wherein the carbonate of the quaternary ammonium is (NR4)2CO3, NR4HCO3, or a mixture thereof (where R denotes a hydrocarbon group).

3. The manufacturing method for a slurry for the production of a precision casting mold for a metal according to claim 1, wherein quaternary ammonium ions in the carbonate of the quaternary ammonium are formed by a hydrocarbon group having 1 to 4 carbon atoms.

4. The manufacturing method for a slurry for the production of a precision casting mold for a metal according to claim 1, wherein the zirconium salt (B1) is an oxyzirconium salt.

5. The manufacturing method for a slurry for the production of a precision casting mold for a metal according to claim 4, wherein the zirconium salt (B1) is a zirconium oxycarbonate.

6. A manufacturing method for a slurry for the production of a precision casting mold for a metal that includes a step in which an alkaline zirconia sol (A2) and a refractory powder (D) are mixed, the alkaline zirconia sol (A2) being obtained by a method that includes a step in which the alkaline zirconia sol (A1) according to claim 1 and a basic zirconium carbonate salt (B2) are mixed.

7. The manufacturing method for a slurry for the production of a precision casting mold according to claim 6, wherein the alkaline zirconia sol (A2) is obtained by a method that includes a step (i'), wherein the alkaline zirconia sol (A1) and the basic zirconium carbonate salt (B2) are mixed in a proportion such that the weight ratio bs/as between the solid content (as) of the alkaline zirconia sol (A1) calculated in terms of ZrO2 and the solid content (bs) of the basic zirconium carbonate salt (B2) calculated in terms of ZrO2 is from 0.05 to 4.0, and a step (ii'), in which the obtained liquid mixture is aged at 20 to 100° C.

8. The manufacturing method for a slurry for the production of a precision casting mold for a metal according to claim 6, wherein the basic zirconium carbonate salt (B2) is an ammonium zirconium carbonate.

9. A manufacturing method for a slurry for the production of a precision casting mold for a metal that includes a step in which an acidic zirconia sol (C3) and a refractory powder (D) are mixed, the acidic zirconia sol (C3) being obtained by a method that includes a step (I), in which an alkaline zirconia sol (A3) and a zirconium salt (B3) are mixed in a proportion such that the weight ratio Bs/As between the solid content (As) of the alkaline zirconia sol (A3) calculated in terms of ZrO2 and the solid content (Bs) of the zirconium salt (B3) calculated in terms of ZrO2 is from 0.2 to 5.0, and a step (II), in which the obtained liquid mixture is caused to react at 80 to 250° C., wherein the alkaline zirconia sol (A3) is the alkaline zirconia sol (A1) according to claim 1.

10. A manufacturing method for a precision casting mold for a metal that includes immersing a wax pattern into the slurry for the production of a precision casting mold according to claim 1, adhering a stucco material to the wax pattern, next, dewaxing by heating the wax pattern to which the stucco material has been adhered, and subsequently calcining the obtained mold.

11. A manufacturing method for a slurry for the production of a precision casting mold for a metal that includes a step in which an acidic zirconia sol (C3) and a refractory powder (D) are mixed, the acidic zirconia sol (C3) being obtained by a method that includes a step (I), in which an alkaline zirconia sol (A3) and a zirconium salt (B3) are mixed in a proportion such that the weight ratio Bs/As between the solid content (As) of the alkaline zirconia sol (A3) calculated in terms of ZrO2 and the solid content (Bs) of the zirconium salt (B3) calculated in terms of ZrO2 is from 0.2 to 5.0, and a step (II), in which the obtained liquid mixture is caused to react at 80 to 250° C.

12. The manufacturing method for a slurry for the production of a precision casting mold for a metal according to claim 11, wherein an aqueous solution that is selected from a group consisting of zirconium oxychloride, zirconium oxynitrate, zirconium oxysulfate, zirconium oxyacetate, and a mixture thereof is used as the zirconium salt (B3) in the step (I).

13. The manufacturing method for a slurry for the production of a precision casting mold for a metal according to claim 11, wherein, as the zirconium salt (B3) in the step (I), either an aqueous solution that includes an aqueous solution of ammonium zirconium carbonate and an acid is used, or an aqueous solution of ammonium zirconium carbonate is used, and then an acid is added to the mixed system and used.

14. The manufacturing method for a slurry for the production of a precision casting mold for a metal according to claim 11, wherein an aqueous solution that is obtained by adding an alkali to an aqueous solution of an oxyzirconium salt is used as the zirconium salt (B3) in the step (I).

15. The manufacturing method for a slurry for the production of a precision casting mold for a metal according to claim 11, wherein an aqueous solution that is obtained by subjecting an aqueous solution of an oxyzirconium salt to anion exchange is used as the zirconium salt (B3) in the step (I).

16. The manufacturing method for a slurry for the production of a precision casting mold for a metal according to claim 11, wherein an aqueous solution that is obtained by adding zirconium hydroxide or zirconium oxycarbonate to an aqueous solution of oxyzirconium salt is used as the zirconium salt (B3) in the step (I).

* * * * *